US007130544B2

(12) United States Patent
Kasahara et al.

(10) Patent No.: US 7,130,544 B2
(45) Date of Patent: Oct. 31, 2006

(54) OPTICAL REPEATING SYSTEM AND OPTICAL AMPLIFYING REPEATER CONTROL METHOD

(75) Inventors: Yasunori Kasahara, Tokyo (JP); Hideki Goto, Tokyo (JP); Takashi Mizuochi, Tokyo (JP); Kenkichi Shimomura, Tokyo (JP); Masatoshi Suzuki, Saitama (JP); Yukio Horiuchi, Saitama (JP); Daishi Ishii, Tokyo (JP); Toshio Kawazawa, Tokyo (JP)

(73) Assignees: Mitsubishi Denki Kabushiki Kaisha, Tokyo (JP); KDDI Corporation, Tokyo (JP); KDDI Submarine Cable Systems Inc., Tokyo (JP)

( * ) Notice: Subject to any disclaimer, the term of this patent is extended or adjusted under 35 U.S.C. 154(b) by 620 days.

(21) Appl. No.: 10/192,705

(22) Filed: Jul. 11, 2002

(65) Prior Publication Data

US 2003/0011857 A1    Jan. 16, 2003

(30) Foreign Application Priority Data

Jul. 11, 2001    (JP) .............................. 2001-211199

(51) Int. Cl.
*H04B 10/02* (2006.01)

(52) U.S. Cl. .................... 398/177; 398/181; 398/30; 398/173; 398/11; 398/33; 398/32; 398/34; 398/37; 398/64; 359/337; 359/341

(58) Field of Classification Search .................. 398/11, 398/32–34, 37, 64, 177, 173, 181, 30; 359/337, 359/341
See application file for complete search history.

(56) References Cited

U.S. PATENT DOCUMENTS

| 4,449,247 A | | 5/1984 | Waschka, Jr. |
| 6,018,406 A | * | 1/2000 | Ishimatsu et al. ............ 398/181 |
| 6,219,176 B1 | | 4/2001 | Terahara |
| 6,452,701 B1 | * | 9/2002 | Terahara et al. .............. 398/30 |
| 6,914,718 B1 | * | 7/2005 | Kasahara et al. ............ 359/337 |

FOREIGN PATENT DOCUMENTS

| JP | 63-148729 | 6/1988 |
| JP | 4-371030 | 12/1992 |
| JP | 2001-16169 | 1/2001 |

* cited by examiner

*Primary Examiner*—Hanh Phan
(74) *Attorney, Agent, or Firm*—Oblon, Spivak, McClelland, Maier & Neustadt, P.C.

(57) ABSTRACT

An optical repeating system includes an optical transmitter and an optical amplifying repeater. The optical transmitter transmits a supervisory command and a control command to the optical amplifying repeater as a first sub-signal. The supervisory command is a command to supervise internal circuits of the optical amplifying repeater, and the control command is a command to control the optical amplifying repeater. The optical amplifying repeater includes multiple sub-modules each for amplifying and repeating main signals on multiple sets of optical transmission lines. When receiving the supervisory command via the optical transmission line, each sub-module transmits a supervisory signal indicating the supervisory result associated with the supervisory command to an optical receiver as a second sub-signal. In addition, when receiving a predetermined control command via the optical transmission line, each sub-module initializes another sub-module of the multiple sub-modules in response to the predetermined control command. The optical amplifying repeater can restart its control program even when it has fallen into a state where it is difficult to continue to execute the normal operation in accordance with the control program because of some exception or the like.

7 Claims, 6 Drawing Sheets

OPTICAL REPEATING SYSTEM AND OPTICAL AMPLIFYING REPEATER CONTROL METHOD

BACKGROUND OF THE INVENTION

1. Field of the Invention

The present invention relates to an optical repeating system that comprises multiple sets of optical transmission lines, optical transmitters and optical receivers for transferring main signals through each set of optical transmission lines, and optical amplifying repeaters for amplifying and repeating the main signal with optical amplifiers at intermediate positions on the multiple sets of optical transmission lines, and to an optical amplifying repeater control method for controlling the optical amplifying repeaters.

2. Description of Related Art

FIG. 4 is a block diagram showing a configuration of a conventional optical repeating system disclosed in Japanese patent No. 2,716,882. In FIG. 4, the reference numeral 1 designates an optical transmitter for transmitting a main signal conveying information and a first sub-signal bearing a command for an optical amplifying repeater 3; 2 designates an optical fiber constituting an optical transmission line for interconnecting the optical transmitter 1, optical amplifying repeaters 3 and an optical receiver 4; 3 designates an optical amplifying repeater located at an intermediate position on the optical fiber 2 for not only amplifying and transmitting the main signal with an optical amplifier, but also for superimposing the supervisory information obtained from the command conveyed by the first sub-signal on the main signal as a second sub-signal, and 4 designates an optical receiver for receiving the main signal and the like.

FIG. 5 is a block diagram showing a configuration of the optical amplifying repeater as shown in FIG. 4. In the optical amplifying repeater 3 as shown in FIG. 5, the reference numeral 101 designates a coupler for splitting the input optical signal; 102 designates an optical amplifier comprising an isolator 111, a pumping laser diode 112, a multiplexing filter 113, an erbium (Er) doped optical fiber 114, and an isolator 115; and 103 designates a coupler for splitting an optical signal output from the optical amplifier 102, and for outputting its first part as the output optical signal.

In FIG. 5, the reference numeral 121 designates a photoelectric converter for converting an optical signal to an electrical signal; 122 designates an amplifier for amplifying the electrical signal; 123 designates a low-pass filter for filtering the sub-signal; 124 designates an incoming call identification circuit for making a decision as to whether the first sub-signal contains an operation command signal addressed to the present repeater; 125 designates a controller for actuating an encoder 131 and a modulator 132 in response to the operation command signal addressed to the present repeater; 131 designates the encoder for encoding intra-repeater information such as the power level of the output optical signal of the optical amplifying repeater 3, the amplification factor of the optical amplifier 102, the driving current level and temperature of the pumping laser diode 112; and 132 designates the modulator for modulating the driving current to be supplied from the pumping laser diode driver 133 to the pumping laser diode 112 by a supervisory signal including the intra-repeater information after encoding. The reference numeral 134 designates a temperature controller for controlling the temperature of the pumping laser diode 112; 141 designates a photoelectric converter for converting an optical signal to an electrical signal; and 142 designates an amplifier for amplifying the electrical signal.

FIG. 6 is a block diagram showing a configuration of the optical transmitter 1 in FIG. 4. In the optical transmitter 1 of FIG. 6, the reference numeral 201 designates a main signal circuit for outputting the main signal used for information transmission; 202 designates a sub-signal circuit for outputting the first sub-signal containing the operation command that specifies the optical amplifying repeater; 203 designates a modulator for superimposing the first sub-signal on the main signal in a prescribed modulating scheme; 204 designates a driver supplied with the main signal on which the first sub-signal is superimposed for driving a semiconductor laser 205; and 205 designates the semiconductor laser for supplying the optical fiber 2 with the optical signal corresponding to the applied electrical signal.

FIG. 7 is a block diagram showing a configuration of the optical receiver in FIG. 4. In the optical receiver 4 of FIG. 7, the reference numeral 301 designates a photoelectric converter for converting the input optical signal fed from the optical fiber 2 to an electrical signal; 302 designates an amplifier for amplifying the electrical signal; 303 designates a main signal demodulator for demodulating the main signal in the received signal; 304 designates a low-pass filter for filtering the first and second sub-signals in the received signal; and 305 designates a sub-signal demodulator for demodulating the first and second sub-signals in the received signal.

Next, the operation of the conventional optical repeating system will be described.

First, the operation of the optical transmitter 1 will be described. The sub-signal circuit 202 generates the first sub-signal, which includes the operation command specifying one of the optical amplifying repeaters 3 by an address code uniquely assigned to each optical amplifying repeater, in such a manner that its amplitude is smaller and its rate is lower than those of the main signal output from the main signal circuit 201. Then, the modulator 203 supplies the driver 204 with the main signal on which the first sub-signal is superimposed. The output optical signal of the semiconductor laser 205 consists of the modulation signal of the main signal plus the first sub-signal superimposed thereon. The optical transmitter 1 transmits the operation command to the next optical amplifying repeater 3 as the first sub-signal in such a manner that an appropriate time interval is reserved after the first sub-signal including the operation command. The reserved time interval enables the specified optical amplifying repeater 3 to transmit a supervisory signal corresponding to the first sub-signal during the reserved time interval as the second sub-signal.

Next, the operation of the optical amplifying repeater 3 will be described. The coupler 101 splits the input optical signal fed from the input side optical fiber 2. A first part of the split input optical signal is launched into the optical amplifier 102 to be amplified. On the other hand, a second part of the split input optical signal is launched into the photoelectric converter 121 to be converted to the electrical signal. The electrical signal is amplified by the amplifier 122, and then the low-pass filter 123 extracts the first sub-signal with a frequency lower than the frequency of the main signal, and supplies it to the incoming call identification circuit 124. The incoming call identification circuit 124 makes a decision as to whether the optical transmitter 1 sends the operation command to this repeater from the address code contained in the first sub-signal, and notifies the controller 125 of the decision result. When the operation command is addressed to the repeater, the controller 125 actuates the encoder 131 and the modulator 132 to modulate the driving current to be supplied from the pumping laser diode driver 133 to the pumping laser diode 112 by the second sub-signal including the intra-repeater information. Since the driving current to the pumping laser diode 112 is modulated by the second sub-signal, the amplification factor of the optical amplifier 102 is modulated. Thus, the optical signal output from the optical amplifier 102 consists of the main signal and the second sub-signal superimposed thereon. On the other hand, when there is no operation command addressed to the repeater, the controller 125 does not actuate the encoder 131 nor the modulator 132. As a result, the pumping laser diode 112 is driven by a non-modulated driving current.

Finally, the operation of the optical receiver 4 will be described. The input optical signal fed from the optical fiber 2 is converted by the photoelectric converter 301 into an electrical signal which is amplified by the amplifier 302. The amplified electrical signal is supplied to the main signal demodulator 303. In parallel with this, the low-pass filter 304 extracts the first and second sub-signals from the electrical signal, and supplies them to the sub-signal demodulator 305. The sub-signal demodulator 305 demodulates the operation command, which is addressed to the optical amplifying repeater 3, from the first sub-signal transmitted from the optical transmitter 1, and the intra-repeater information from the second sub-signal transmitted from the optical amplifying repeater 3. Thus, the operating state of each optical amplifying repeater 3 can be supervised.

In this way, the optical transmitter 1 selects one of the optical amplifying repeaters 3 one by one, and transmits the operation command by superimposing it on the main signal. Receiving the operation command addressed to it, each optical amplifying repeater 3 superimposes the supervisory information about the repeater on the main signal, and sends it to the optical receiver 4. The optical receiver 4 demodulates the supervisory information sent from the optical amplifying repeaters 3 sequentially.

With the foregoing configuration, the conventional optical repeating system has a problem in that it difficult for the control program that controls the optical amplifying repeaters 3 to restart its normal operation once it has fallen into a trouble where it can hardly continue its normal processing because of some exception. For example, once the control program has fallen into a state where it is difficult to execute any processing in accordance with the first sub-signal, and/or to execute the receiving processing of that normally, the control program can scarcely restart the optical amplifying repeater.

SUMMARY OF THE INVENTION

The present invention is implemented to solve the foregoing problem. It is therefore an object of the present invention to provide an optical repeating system and optical amplifying repeater control method capable of recovering a sub-module that has fallen into a trouble to the normal operating state with ease.

According to a first aspect of the present invention, there is provided an optical repeating system comprising: multiple sets of optical transmission lines; an optical transmitter and an optical receiver for transmitting and receiving main signals via the multiple sets of optical transmission lines; and an optical amplifying repeater installed at an intermediate position on the multiple sets of optical transmission lines for amplifying and repeating the main signals with optical amplifiers, wherein the optical transmitter transmits a first sub-signal containing at least one of a supervisory command and a control command to the optical amplifying repeater, the supervisory command commanding to supervise internal circuits of the optical amplifying repeater, and the control command commanding to control the optical amplifying repeater, wherein the optical amplifying repeater includes a multiple sub-modules for amplifying and repeating the main signals on the multiple sets of optical transmission lines, and wherein each of the sub-modules transmits, when receiving the supervisory command via one of the optical transmission lines, a second sub-signal containing a supervisory signal indicating a supervisory result corresponding to the supervisory command to the optical receiver, and initializes, when receiving a predetermined control command via one of the optical transmission lines, another sub-module of the multiple sub-modules in response to the predetermined control command.

Here, each of the sub-modules may execute processing corresponding to the supervisory command and the control command in accordance with a prescribed control program, and restart, when receiving the predetermined control command, the another sub-module of the multiple sub-modules in response to the predetermined control command.

The multiple sets of optical transmission lines may each consist of a pair of uplink and downlink bidirectional optical transmission lines, and each of the multiple sub-modules may amplify and repeat the main signals on the uplink and downlink optical transmission lines, receive the first sub-signal via the uplink or downlink optical transmission line, and transmit the second sub-signal via the uplink and downlink optical transmission lines.

Each of the sub-modules may execute self-diagnosis in accordance with a self-diagnosis program, supply its self-diagnosis result to the another sub-module of the multiple sub-modules, and transmit a self-diagnosis result from the another sub-module of the multiple sub-modules to the optical receiver.

Each of the sub-modules may update data and control program of the another sub-module of the multiple sub-modules.

According to a second aspect of the present invention, there is provided an optical amplifying repeater control method of controlling an optical amplifying repeater in an optical repeating system including multiple sets of optical transmission lines, an optical transmitter and an optical receiver for transmitting and receiving main signals via the multiple sets of optical transmission lines, and an optical amplifying repeater installed at an intermediate position on the multiple sets of optical transmission lines for amplifying and repeating the main signals with optical amplifiers, the optical amplifying repeater control method comprising the steps of: transmitting a first sub-signal containing at least one of a supervisory command and a control command to the optical amplifying repeater by the optical transmitter, the supervisory command commanding to supervise internal circuits of the optical amplifying repeater, and the control command commanding to control the optical amplifying repeater; receiving at least one of the supervisory command and the control command by one of multiple sub-modules in the optical amplifying repeater via the multiple sets of optical transmission lines, the multiple sub-modules amplifying and repeating the main signals on the multiple sets of optical transmission lines; and transmitting a second sub-signal that contains a supervisory signal indicating supervisory result corresponding to the supervisory command from the one of multiple sub-modules to the optical receiver when the one of multiple sub-modules receives the supervisory command, and initializing, when the one of multiple sub-modules receives a predetermined control command, another sub-module of the multiple sub-modules in response to the predetermined control command.

According to a third aspect of the present invention, there is provided an optical amplifying repeater control method of controlling an optical amplifying repeater in an optical repeating system including multiple sets of optical transmission lines, an optical transmitter and an optical receiver for transmitting and receiving main signals via the multiple sets of optical transmission lines, and an optical amplifying repeater installed at an intermediate position on the multiple sets of optical transmission lines for amplifying and repeating the main signals with optical amplifiers, the optical amplifying repeater including multiple sub-modules each for amplifying and repeating the main signals on the multiple sets of optical transmission lines, the optical amplifying repeater control method comprising the steps of: transmitting a first sub-signal containing at least one of a supervisory command and a control command from the optical transmitter to the optical amplifying repeater, the supervisory command commanding to supervise internal circuits of the optical amplifying repeater, and the control command commanding to control the optical amplifying repeater; and transmitting, when one of the multiple sub-modules receives the supervisory command via the optical transmission lines, a second sub-signal containing a supervisory signal indicating supervisory result corresponding to the supervisory command from the one of the multiple sub-modules to the optical receiver, and switching, when the one of the sub-modules receives a predetermined control command via the optical transmission lines, the optical transmission line for transmitting the second sub-signal to the transmission line of another set of the multiple sets of optical transmission lines, via another sub-module of the multiple sub-modules in response to the predetermined control command.

DETAILED DESCRIPTION OF THE PREFERRED EMBODIMENT

The invention will now be described with reference to the accompanying drawings.

Figure 1:
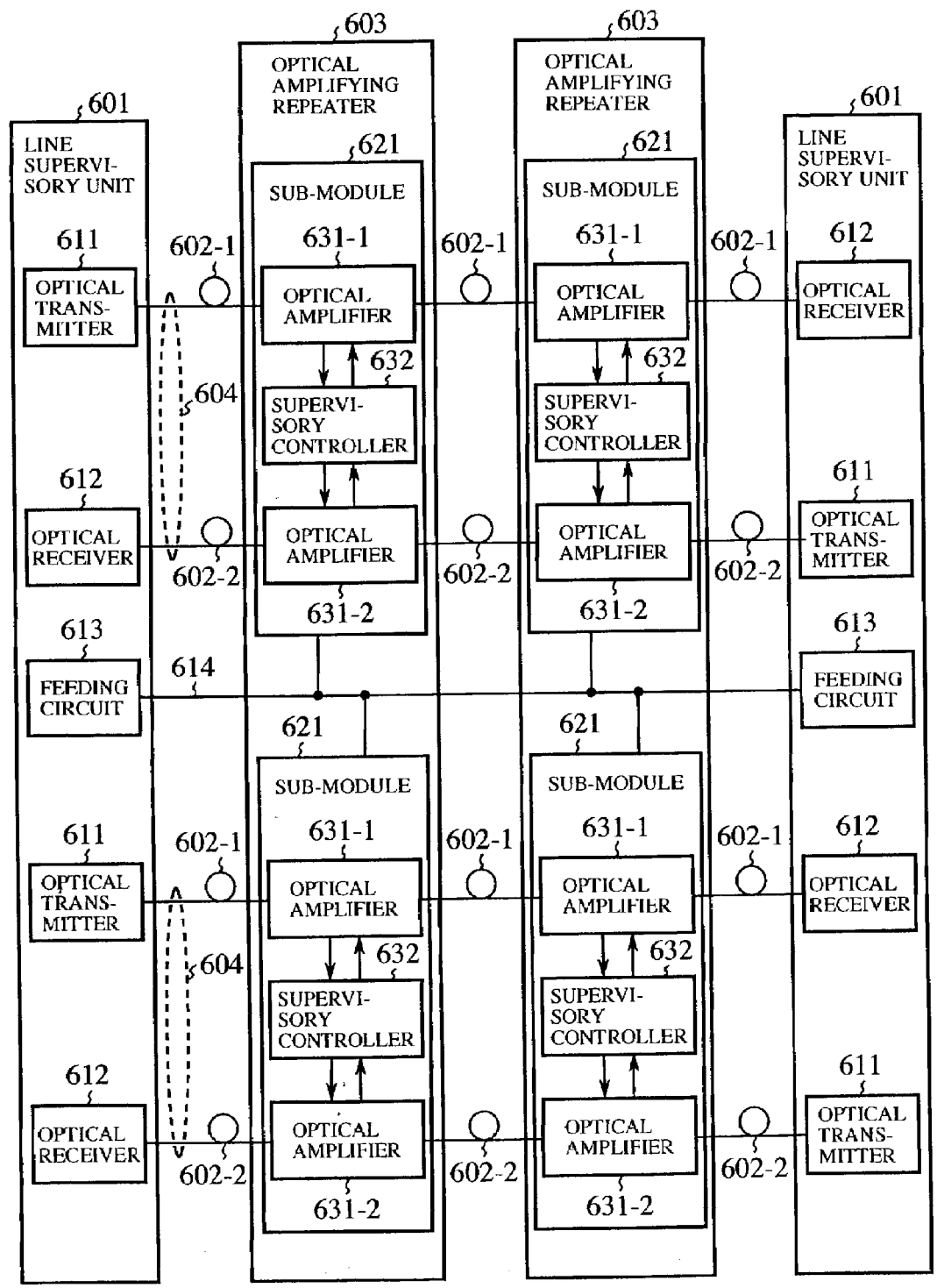
FIG. 1 is a block diagram showing a configuration of an embodiment 1 of the optical repeating system in accordance with the present invention.
Figure 6:
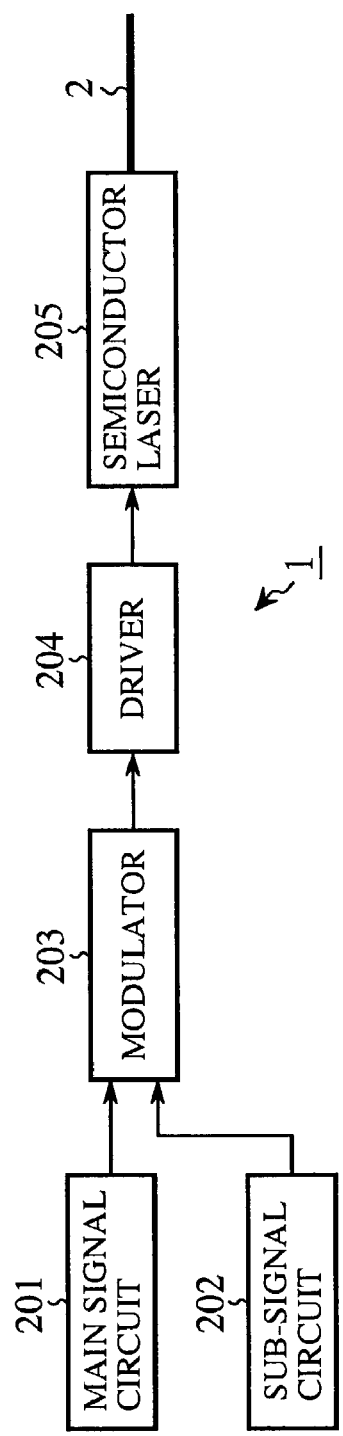
FIG. 6 is a block diagram showing a configuration of the optical transmitter of FIG. 4.
Figure 7:
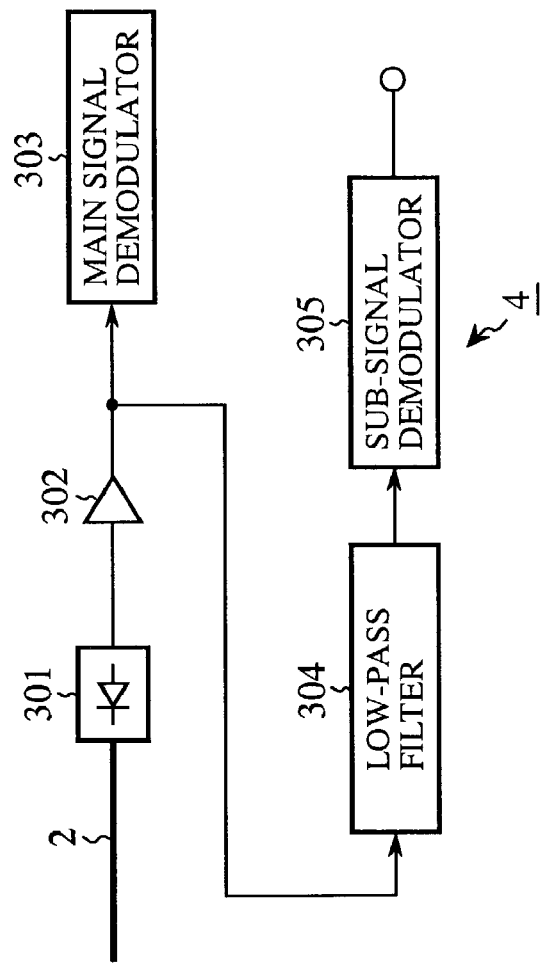
FIG. 7 is a block diagram showing a configuration of the optical receiver of FIG. 4.

FIG. 1 is a block diagram showing a configuration of an embodiment 1 of the optical repeating system in accordance with the present invention. In FIG. 1, the reference numeral 601 designates a line supervisory unit. The line supervisory unit 601 comprises optical transmitters 611 and optical receivers 612 serving as terminals of uplink and downlink bidirectional optical transmission lines, each of which consists of the optical fibers 602-1 and 602-2. The line supervisory unit 601 further comprises a feeding circuit 613 for supplying current to each optical amplifying repeater 603 via a feeder line 614. Here, the optical transmitters 611 and optical receivers 612 have the same configuration as those of FIGS. 6 and 7.

In FIG. 1, reference numerals 602-1 and 602-2 each designate an optical fiber constituting the bidirectional optical transmission line; and 603 designates an optical amplifying repeater that amplifies main signals on a multiple bidirectional optical transmission lines, and that comprises a multiple sub-modules 621 for receiving the first sub-signal and carries out the processing thereof. In FIG. 1, a pair of the bidirectional optical transmission lines are installed, where each bidirectional optical transmission line is defined as an optical fiber pair 604 consisting of the optical fiber 602-1 and optical fiber 602-2.

In each sub-module 621, the reference numeral 631-1 designates an optical amplifier mounted on the uplink optical transmission line (optical fiber 602-1) for amplifying the main signal; 631-2 designates an optical amplifier mounted on the downlink optical transmission line (optical fiber 602-2) for amplifying the main signal; and 632 designates a supervisory controller that transmits, when receiving the supervisory command addressed to the repeater from the optical transmitter 611 via the uplink optical transmission line or the downlink optical transmission line, the supervisory signal indicating the supervisory result corresponding to the supervisory command to the optical receivers 612 via the uplink optical transmission line and downlink optical transmission line as the second sub-signal, and that controls, when receiving the control command via the uplink optical transmission line (or the downlink optical transmission line), the amplification factor of the optical amplifier 631-1 (optical amplifier 631-2) in accordance with the control command.

Figure 2:
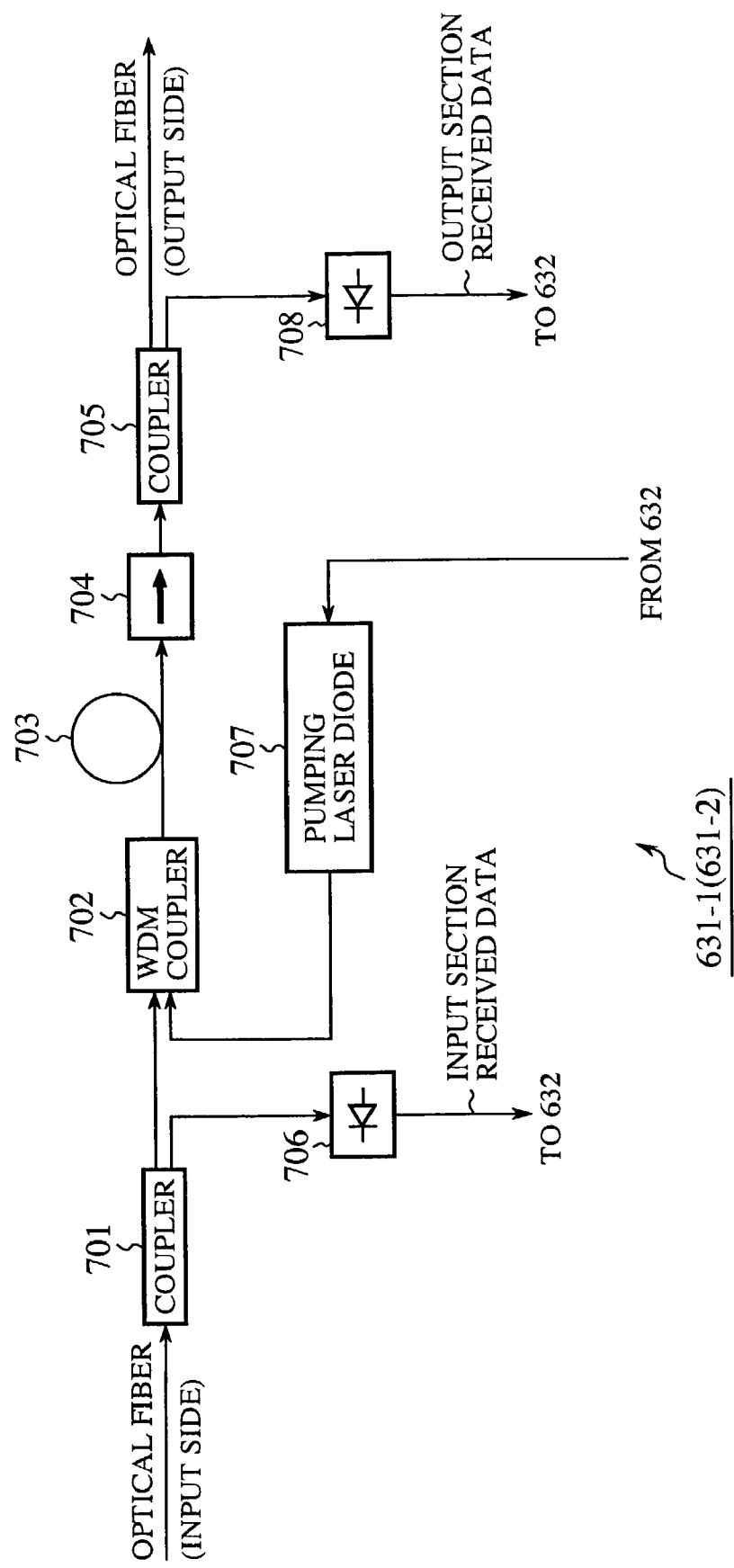
FIG. 2 is a block diagram showing a configuration of an optical amplifier of FIG. 1.

FIG. 2 is a block diagram showing a configuration of the optical amplifier 631-1 or 631-2 as shown in FIG. 1. In FIG. 2, the reference numeral 701 designates a coupler for splitting the input optical signal; 702 designates a WDM (Wavelength Division Multiplexing) coupler for combining the optical signal with the pumping laser light; 703 designates an erbium (Er) doped fiber; 704 designates an isolator; and 705 designates a coupler for splitting the amplified optical signal, and outputting its first part as the output optical signal. The reference numeral 706 designates a photoelectric converter for converting the optical signal into an electrical signal; 707 designates a pumping laser diode for applying the pumping laser light to the erbium (Er) doped fiber 703 via the WDM coupler 702; and 708 designates a photoelectric converter for converting the optical signal to an electrical signal.

Figure 3:
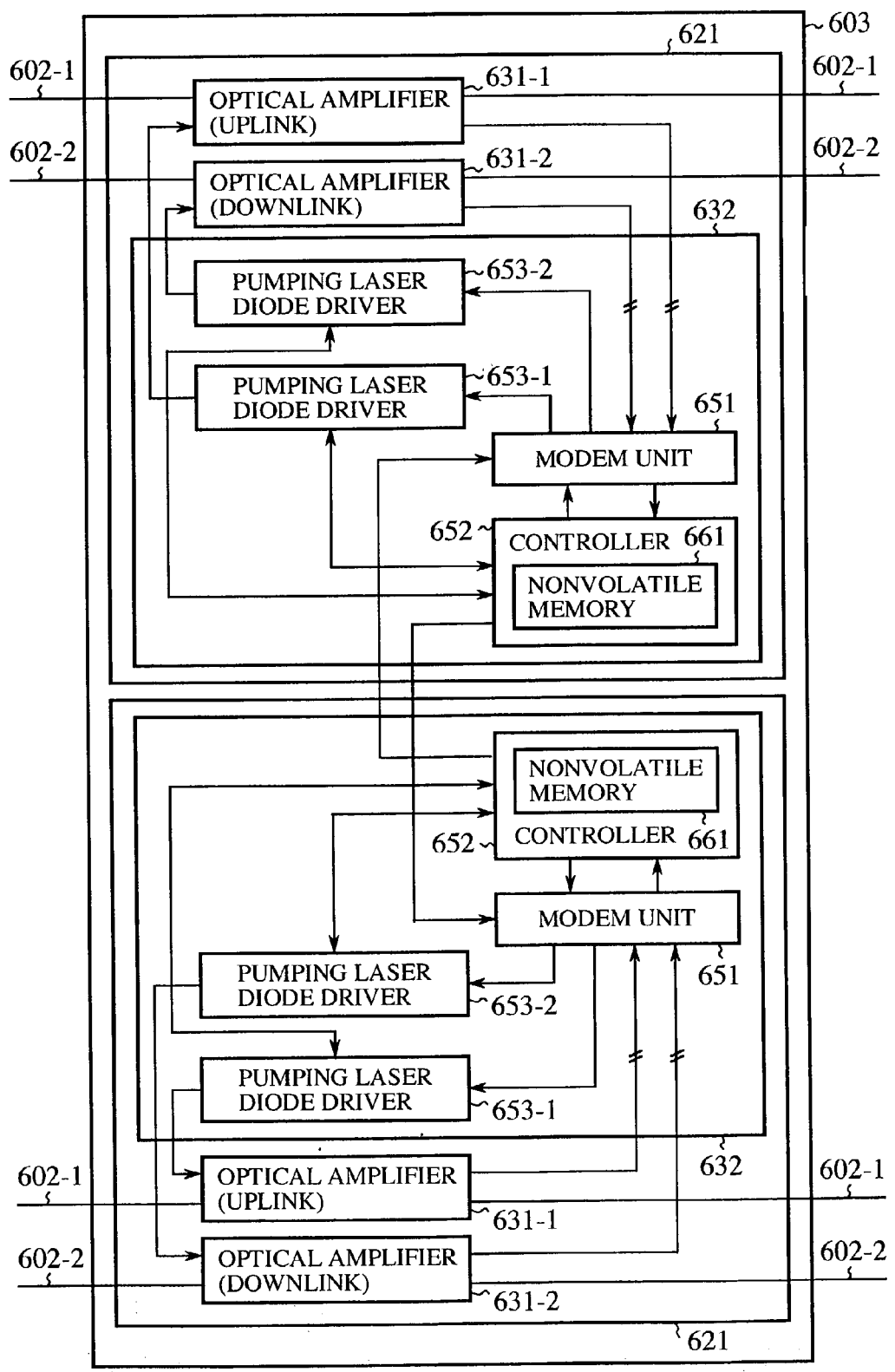
FIG. 3 is a block diagram showing a configuration of an optical amplifying repeater of FIG. 1.
Figure 4:
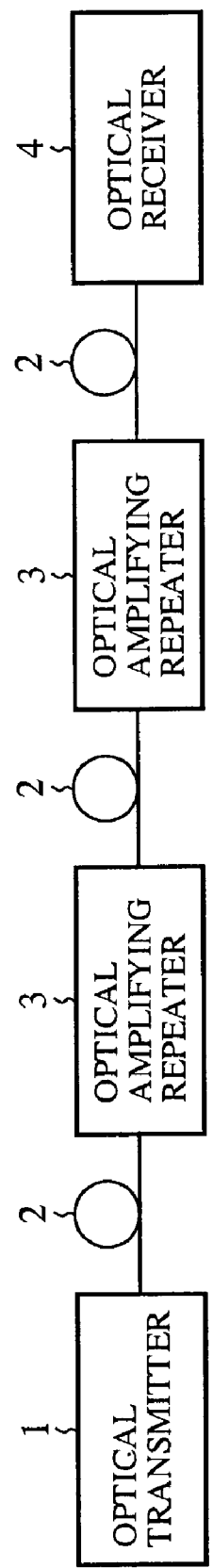
FIG. 4 is a block diagram showing a configuration of a conventional optical repeating system.
Figure 5:
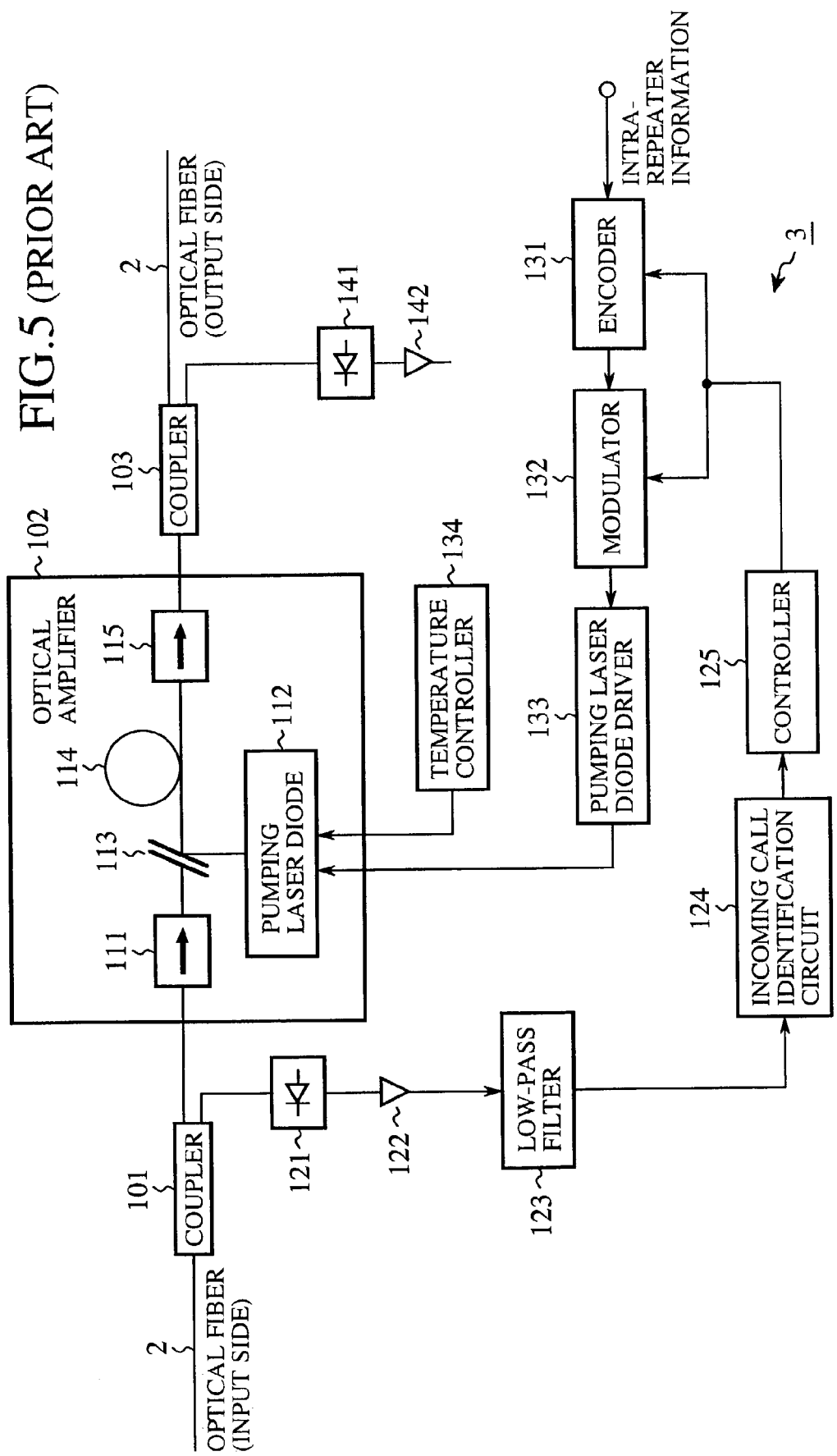
FIG. 5 is a block diagram showing a configuration of an optical amplifying repeater of FIG. 4.

FIG. 3 is a block diagram showing a configuration of the optical amplifying repeater 603 as shown in FIG. 1. In FIG. 3, the reference numeral 651 designates a modem unit. The modem unit 651 extracts and demodulates the first sub-signal sent from the optical transmitter 611 of the line supervisory unit 601. It also modulates the driving current to the pumping laser diode 707 by the supervisory signal that includes various items of the intra-repeater information corresponding to the supervisory command. It carries out the modulation by controlling the pumping laser diode drivers 653-1 and 653-2, thereby superimposing the supervisory signal on the main signal as the second sub-signal. The reference numeral 652 designates a controller that operates as follows. When detecting the supervisory command addressed to the repeater from the first sub-signal, the controller 652 collects the intra-repeater information, and supplies the modem unit 651 with the supervisory signal indicating the intra-repeater information. On the other hand, when detecting the control command addressed to the repeater from the first sub-signal, it controls the amplification factors of the pumping laser diode drivers 653-1 and 653-2, thereby controlling the optical amplifiers 631-1 and 631-2. The reference numeral 661 designates a nonvolatile memory such as an FRAM (Ferro-electric Random Access Memory) and MRAM (Magneto-resistive Random Access Memory) for storing the set values of the amplification factors of the optical amplifiers 631-1 and 631-2, the intra-repeater information and the like. The reference numeral 653-1 designates the pumping laser diode driver for supplying the driving current to the pumping laser diode 707 of the optical amplifier 631-1; and 653-2 designates a pumping laser diode driver for supplying the driving current to the pumping laser diode 707 of the optical amplifier 631-2.

The controller 652 can be implemented by a microcomputer that comprises a ROM (Read Only Memory) for storing the control program, a RAM serving as a working area and a CPU (Central Processing Unit). Alternatively, the entire supervisory controller 632 can be implemented by a microcomputer.

Next, the operation of the present embodiment 1 will be described.

The feeding circuits 613 of the line supervisory units 601 at both ends of the optical transmission line feed a current to the individual optical amplifying repeaters 603 through the feeder line 614.

Then, the optical transmitter 611 of the line supervisory unit 601 transmits the main signal to the optical receiver 612 of the far-end line supervisory unit 601. In addition, when transmitting a supervisory command or control command to a specified optical amplifying repeater 603, the optical transmitter 611 superimposes on the main signal the first sub-signal that contains the address code uniquely assigned to the specified optical amplifying repeater 603 and the supervisory command or control command.

In this case, the optical transmitter 611 modulates a carrier by the main signal, superimposes the first sub-signal, converts the resultant electrical signal to the optical signal, and supplies the optical signal to the optical fiber 602-1 (or 602-2).

Subsequently, receiving the optical signal via the optical fiber 602-1 (602-2), the optical amplifying repeater 603 operates as follows. First, the coupler 701 splits the optical signal, and supplies a first part of the optical signal to the Er doped optical fiber 703 via the WDM coupler 702. In this case, the WDM coupler 702 combines the first part of the optical signal with the pumping laser light fed from the pumping laser diode 707. Then, the optical signal amplified by the Er doped optical fiber 703 is launched into the coupler 705 via the isolator 704 to be split by the coupler 705, and a first part of the split optical signal is supplied to the optical fiber 602-1 (602-2). Thus, the main signal is amplified and repeated by the optical amplifier 631-1 (631-2) of the optical amplifying repeater 603.

On the other hand, a second part of the optical signal split by the coupler 701 is converted into an electrical signal by the photoelectric converter 706, and the electrical signal is supplied to the modem unit 651 of the supervisory controller 632. Likewise, a second part of the optical signal split by the coupler 705 is converted into an electrical signal by the photoelectric converter 708, and the electrical signal is supplied to the modem unit 651 of the supervisory controller 632.

The modem unit 651 extracts and demodulates only the first sub-signal from the electrical signal fed from the photoelectric converter 706, and supplies it to the controller 652. The modem unit 651 also measures the power level of the output optical signal from the electrical signal fed from the photoelectric converter 708, and notifies the controller 652 of the power level.

The controller 652, referring to its uniquely assigned address code that is stored in the nonvolatile memory 661, makes a decision as to whether the first sub-signal contains the same address code as the uniquely assigned address code. When the first sub-signal contains the same address code as the uniquely assigned address code, the controller 652 performs the processing corresponding to the supervisory command or control command contained in the first sub-signal. On the other hand, when the first sub-signal does not include the same address code as the uniquely assigned address code, the controller 652 disregards the first sub-signal.

Detecting the supervisory command addressed to the repeater, the controller 652 collects the intra-repeater information in response to the supervisory command. The intra-repeater information includes such information items as the power levels of the input and output optical signals of the optical amplifying repeater 603, the amplification factors of the optical amplifiers 631-1 and 631-2, and the driving current level for the pumping laser diode 707. The modulation factors of the second sub-signal are measured at the optical receiver 612 on receiving such a second sub-signal exactly as it is that the intra-repeater receives the first sub-signal by return.

As the supervisory command, there are a start command for starting collection of the intra-repeater information, a selection command for selecting information to be transmitted to the optical receiver 612 from the intra-repeater information after collecting the intra-repeater information, and a transmission command for transmitting the selected information. For example, the optical transmitter 611 sends the start command, and then the selection command after a sufficient time period has elapsed to collect the intra-repeater information, followed by sending the transmission command. Incidentally, the these commands can be sent at once as a single command instead of sending them step by step.

After collecting the intra-repeater information, the, controller 652 converts the analog values of the information to digital data, and supplies the data to the modem unit 651. The modem unit 651 generates the supervisory signal by modulating a prescribed subcarrier different from the carrier of the main signal. Then, the modem unit 651 modulates the driving current of the pumping laser diode 707 in the optical amplifier 631-1 and that of the pumping laser diode 707 in the optical amplifier 631-2 by the supervisory signal by controlling the pumping laser diode drivers 653-1 and 653-2, thereby superimposing the supervisory signal on both the uplink and downlink main signals as the second sub-signal. In the course of this, the controller 652 generates the digital data within a predetermined quantization error, temporarily stores the data in a memory not shown, and reads the data of the selected supervisory information from the memory when it detects the selection command.

In addition, detecting the control command addressed thereto, the controller 652 controls the internal circuits in response to the control command.

As the control command, there is an alternative sub-module restart command to restart the control program of the controller 652 of a sub-module 621 different from the sub-module 621 that receives the initialization command (that is, one of remaining sub-modules 621 in the optical amplifying repeater), and to initialize the different sub-module 621.

Detecting the alternative sub-module restart command, the controller 652 supplies the controller 652 of the different sub-module 621 with the restart command to restart the control program in the controller 652. The microcomputer constituting the controller 652 usually comprises a reset terminal so that the microcomputer is restarted when a predetermined signal is applied to the reset terminal. In this case, the controller 652 applies the predetermined signal to the reset terminal to restart the controller 652 of the different sub-module 621.

The optical receiver 612 in the far-end line supervisory unit 601 opposing to the line supervisory unit 601 that transmits the supervisory command receives the optical signal via the optical fiber 602-1 or 602-2. After converting the optical signal to the electrical signal, the optical receiver 612 demodulates it to the main signal and first and second sub-signals. Likewise, the optical receiver 612 of the line supervisory unit 601 that transmits the supervisory command receives the second sub-signal via the reverse direction optical fiber 602-2 or 602-1. The line supervisory unit 601 displays the supervisory information obtained from the second sub-signal on a display not shown or prints it out by a printer not shown.

When the supervisory controller 632 does not receive the command addressed thereto, it only drives the pumping laser diodes 707 with a reference current without performing the superimposition of the second sub-signal. Incidentally, the supervision and control of the optical amplifying repeater 603 can be achieved for individual sub-modules 621 via the optical transmission line.

Next, the operation of restarting the supervisory controller 632 of a sub-module 621 will be described when the control program of the supervisory controller 632 falls into a failure like an exception.

In this case, it is difficult for the faulty sub-module 621 to receive the restart command conveyed by the first sub-signal via the optical transmission line connected to the faulty sub-module 621, and hence to recover the sub-module 621 to the normal operation. In this state, it is also difficult to acquire the supervisory information from the sub-module 621. Thus, it is necessary to restore the normal operation of the sub-module 621.

Therefore, the line supervisory unit 601 transmits the alternative sub-module restart command as the first sub-signal to initialize the faulty sub-module 621 to the alternative sub-module 621 in the optical amplifying repeater 603 where the faulty sub-module 621 is present via the optical transmission line connected to the alternative sub-module.

Receiving the alternative sub-module restart command, the controller 652 of the supervisory controller 632 of the alternative sub-module 621 restarts the control program of the controller 652 of the sub-module 621 specified by the alternative sub-module restart command, thereby placing the operating state of the sub-module 621 at the initial state. Thus, the operating state of the sub-module 621 returns to the normal operating state.

In this way, the faulty sub-module 621 is brought into the normal state, again.

Here, the controller 652 of each sub-module 621 executes the diagnosis of its own supervisory controller 632 in accordance with its self-diagnostic program, and sends the diagnostic result to the modem unit 651 of the adjacent sub-module 621. The diagnostic result is sent to the line supervisory unit 601 so that it can detect the failure of the sub-module 621 from the diagnostic result.

It is also possible to transfer the data and control program between the sub-modules 621. For example, the controller 652 of the sub-module 621 can store the data and control program in its own nonvolatile memory 661, and update their counterparts in the nonvolatile memory 661 of the controller 652 of the adjacent sub-module 621. Alternatively, the controller 652 of the sub-module 621 can acquire new data and control program from the line supervisory unit 601, and update their counterparts stored in the nonvolatile memory 661 in the controller 652 of the adjacent sub-module 621 by the new data and control program.

As described above, the present embodiment 1 is configured as follows. The optical transmitter 611 transmits the supervisory command and the control command to the optical amplifying repeater 603 as the first sub-signal, where the supervisory command is to supervise the internal circuits in the optical amplifying repeater 603, and the control command is to control the optical amplifying repeater 603. Any one of the multiple sub-modules 621 in the optical amplifying repeater 603, which amplifies and repeats the main signals on the multiple sets of the optical transmission lines, receives the supervisory command and the control command via the optical transmission line. When the sub-module 621 receives the supervisory command, it transmits the supervisory signal indicating the supervisory result associated with the supervisory command to the optical receiver 612 as the sub-signal. On the other hand, when the sub-module 621 receives the control command, it initializes the alternative sub-module 621 in response to the control command. As a result, the present embodiment 1 offers an advantage of being able to bring the faulty sub-module 621 into the normal operating state with ease.

Embodiment 2

The present embodiment 2 of the optical repeating system in accordance with the present invention is configured such that each sub-module 621 switches when necessary the optical transmission line for transmitting the second sub-signal to the alternative optical transmission line in response to the control command via the alternative sub-module 621.

Specifically, when there are two pairs of the uplink and downlink optical transmission lines as shown in FIG. 1, and if one pair of the optical transmission lines has a failure, the controller 652 of the supervisory controller 632 in the sub-module 621 of the faulty system controls the modem unit 651 of the supervisory controller 632 in the sub-module 621 of the faultless system, so that the second sub-signal is transmitted to the optical receivers 612 to which the second sub-signal cannot be transmitted via the faulty system.

Since the remaining configuration and the operation of the embodiment 2 of the optical repeating system are the same as those of the foregoing embodiment 1, the description thereof is omitted here.

As described above, the present embodiment 2 is configured such that it transmits the second sub-signal to the optical receiver 612 via a pair of the optical transmission lines different from that through which the first sub-signal is received among a multiple pairs of the uplink and downlink optical transmission lines. As a result, the present embodiment 2 offers an advantage of being able to acquire the supervisory information even if one of the systems suffers from a failure, thereby improving the redundancy.

Although the foregoing embodiments 1 and 2 are described taking an example where the number of the optical amplifying repeaters 603 is two, it is obvious that any number of the optical amplifying repeaters are allowable. Besides, although two uplink/downlink optical fibers 602-1 and 602-2 are provided, any number of the optical fibers are applicable.

What is claimed is:

1. An optical repeating system comprising:
   multiple sets of optical transmission lines;
   an optical transmitter and an optical receiver for transmitting and receiving main signals via said multiple sets of optical transmission lines; and
   an optical amplifying repeater installed at an intermediate position on said multiple sets of optical transmission lines for amplifying and repeating the main signals with optical amplifiers, wherein
   said optical transmitter transmits a first sub-signal containing at least one of a supervisory command and a control command to said optical amplifying repeater, the supervisory command commanding to supervise internal circuits of said optical amplifying repeater, and the control command commanding to control said optical amplifying repeater, wherein
   said optical amplifying repeater includes a multiple sub-modules for amplifying and repeating the main signals on said multiple sets of optical transmission lines, and wherein
   each of said sub-modules transmits, when receiving the supervisory command via one of said optical transmission lines, a second sub-signal containing a supervisory signal indicating a supervisory result corresponding to the supervisory command to said optical receiver, and initializes, when receiving a predetermined control command via one of said optical transmission lines, another sub-module of said multiple sub-modules in response to the predetermined control command.

2. The optical repeating system according to claim 1, wherein each of said sub-modules executes processing corresponding to the supervisory command and the control command in accordance with a prescribed control program, and restarts, when receiving the predetermined control command, the another sub-module of said multiple sub-modules in response to the predetermined control command.

3. The optical repeating system according to claim 2, wherein each of said sub-modules updates data and control program of the another sub-module of said multiple sub-modules.

4. The optical repeating system according to claim 1, wherein said multiple sets of optical transmission lines each consist of a pair of uplink and downlink bidirectional optical transmission lines, and wherein each of said multiple sub-modules amplifies and repeats the main signals on said uplink and downlink optical transmission lines, receives the first sub-signal via said uplink or downlink optical transmission line, and transmits the second sub-signal via said uplink and downlink optical transmission lines.

5. The optical repeating system according to claim 1, wherein each of said sub-modules executes self-diagnosis in accordance with a self-diagnosis program, supplies its self-diagnosis result to the another sub-module of said multiple sub-modules, and transmits a self-diagnosis result from the another sub-module of said multiple sub-modules to said optical receiver.

6. An optical amplifying repeater control method of controlling an optical amplifying repeater in an optical repeating system including multiple sets of optical transmission lines, an optical transmitter and an optical receiver for transmitting and receiving main signals via said multiple sets of optical transmission lines, and an optical amplifying repeater installed at an intermediate position on said multiple sets of optical transmission lines for amplifying and repeating the main signals with optical amplifiers, said optical amplifying repeater control method comprising the steps of:
   transmitting a first sub-signal containing at least one of a supervisory command and a control command to said optical amplifying repeater by said optical transmitter, the supervisory command commanding to supervise internal circuits of said optical amplifying repeater, and the control command commanding to control said optical amplifying repeater;
   receiving at least one of the supervisory command and the control command by one of multiple sub-modules in said optical amplifying repeater via said multiple sets of optical transmission lines, said multiple sub-modules amplifying and repeating the main signals on said multiple sets of optical transmission lines; and
   transmitting a second sub-signal that contains a supervisory signal indicating supervisory result corresponding to the supervisory command from said one of multiple sub-modules to said optical receiver when said one of multiple sub-modules receives the supervisory command, and initializing, when said one of multiple sub-modules receives a predetermined control command, another sub-module of said multiple sub-modules in response to the predetermined control command.

7. An optical amplifying repeater control method of controlling an optical amplifying repeater in an optical repeating system including multiple sets of optical transmission lines, an optical transmitter and an optical receiver for transmitting and receiving main signals via said multiple sets of optical transmission lines, and an optical amplifying repeater installed at an intermediate position on said multiple sets of optical transmission lines for amplifying and repeating the main signals with optical amplifiers, said optical amplifying repeater including multiple sub-modules each for amplifying and repeating the main signals on said multiple sets of optical transmission lines, said optical amplifying repeater control method comprising the steps of:
   transmitting a first sub-signal containing at least one of a supervisory command and a control command from said optical transmitter to said optical amplifying repeater, the supervisory command commanding to supervise internal circuits of said optical amplifying repeater, and the control command commanding to control said optical amplifying repeater; and
   transmitting, when one of said multiple sub-modules receives the supervisory command via said optical transmission lines, a second sub-signal containing a supervisory signal indicating supervisory result corresponding to the supervisory command from said one of said multiple sub-modules to said optical receiver, and switching, when said one of sub-modules receives a predetermined control command via said optical transmission lines, the optical transmission line for transmitting the second sub-signal to the transmission line of another set of said multiple sets of optical transmission lines, via another sub-module of said multiple sub-modules in response to the predetermined control command.

* * * * *

UNITED STATES PATENT AND TRADEMARK OFFICE
CERTIFICATE OF CORRECTION

| | | |
|---|---|---|
| PATENT NO. | : 7,130,544 B2 | Page 1 of 1 |
| APPLICATION NO. | : 10/192705 | |
| DATED | : October 31, 2006 | |
| INVENTOR(S) | : Kasahara et al. | |

It is certified that error appears in the above-identified patent and that said Letters Patent is hereby corrected as shown below:

On the title page, the Terminal Disclaimer information has been omitted. Item (45) and the Notice information should read:

-- [45] Date of Patent:           * Oct. 31, 2006

[*] Notice:  Subject to any disclaimer, the term of this patent is extended or adjusted under 35 U.S.C. 154(b) by 620 days.

This patent is subject to a terminal disclaimer. --

Signed and Sealed this

Sixteenth Day of January, 2007

JON W. DUDAS
*Director of the United States Patent and Trademark Office*